J. W. HOPKINS.
ELECTRIC OVEN.
APPLICATION FILED MAY 8, 1918.
1,294,269.
Patented Feb. 11, 1919.
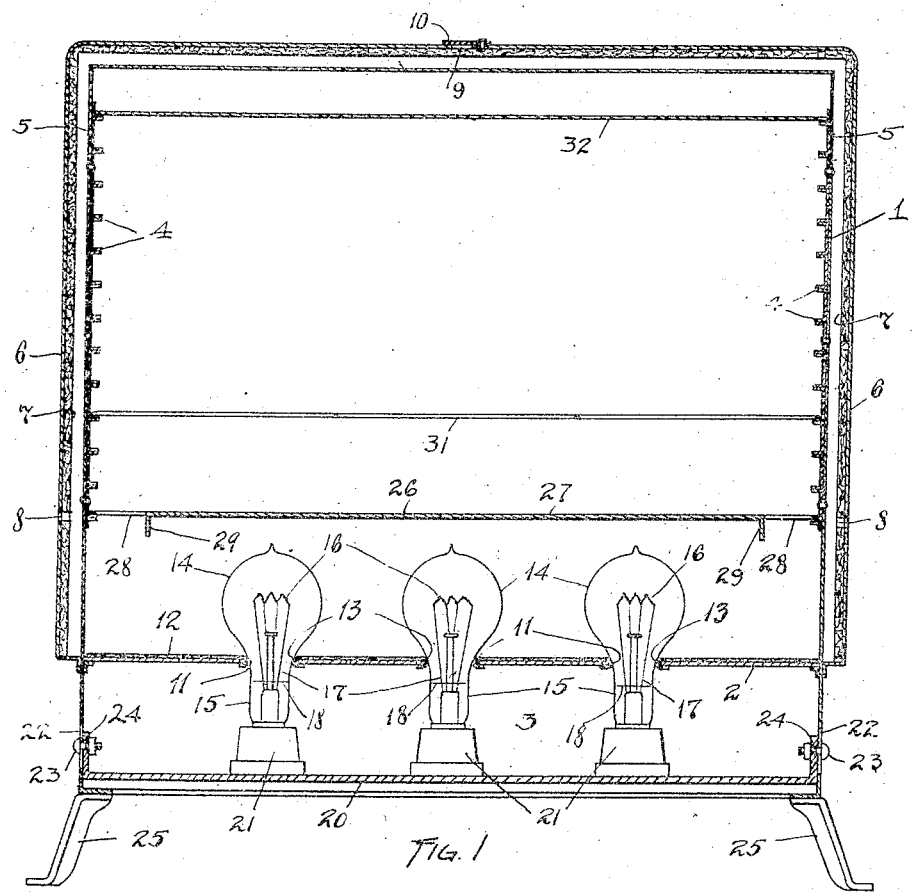
Fig. 1
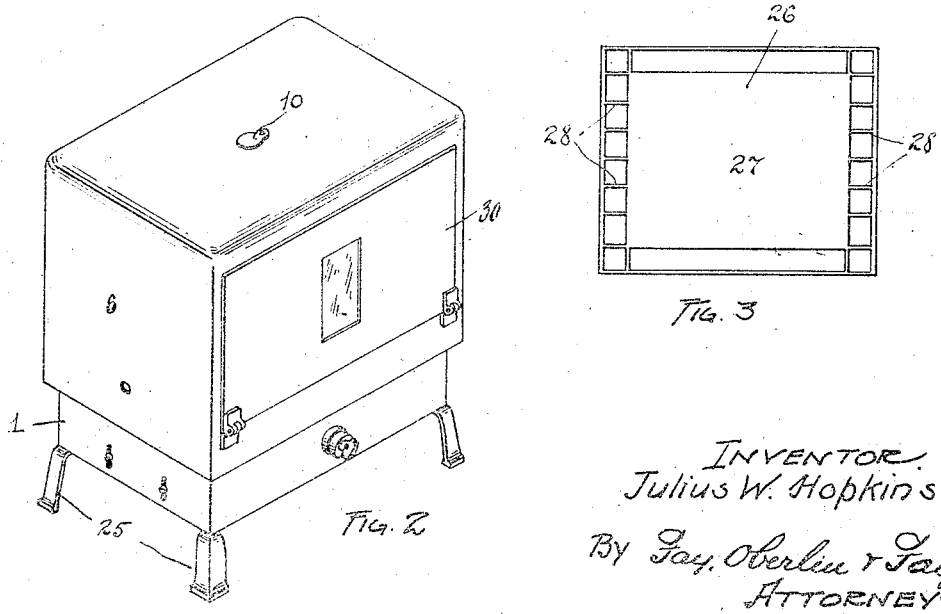
Fig. 2
Fig. 3
INVENTOR
Julius W. Hopkins
By Fay, Oberlin & Fay
ATTORNEYS

UNITED STATES PATENT OFFICE.

JULIUS W. HOPKINS, OF CLEVELAND, OHIO.

ELECTRIC OVEN.

1,294,269.　　　　Specification of Letters Patent.　　Patented Feb. 11, 1919.

Application filed May 8, 1918. Serial No. 233,190.

*To all whom it may concern:*

Be it known that I, JULIUS W. HOPKINS, a citizen of the United States, and a resident of Cleveland, county of Cuyahoga, and State of Ohio, have invented a new and useful Improvement in Electric Ovens, of which the following is a specification, the principle of the invention being herein explained and the best mode in which I have contemplated applying that principle, so as to distinguish it from other inventions.

The present invention relates to electric ovens of a size conveniently handled and moved about, and has for its object the reduction of weight in such an oven and the use of heating means which may be quickly and inexpensively replaced. The oven provides heating means which act quickly to bring the oven to the desired degree of heat and then to maintain it at the correct temperature.

In accomplishing these objects, for the usual heavy grid heaters, I have employed standard electric bulbs of the type having a concentrated filament set in the bulb part and having a narrow portion carrying the leads and ending in the usual base. This part of the bulb must be protected from excess amounts of heat and I have so arranged the oven and bulbs that the extending portion of the bulb is kept cool but the heat loss is reduced to a minimum. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:

Figure 1 is a vertical section through my improved oven; Fig. 2 is a perspective view of the oven; and Fig. 3 is a plan view of the hot plate.

As shown, my oven consists of a metal casing 1 having a bottom 2 and having its sides extending below the bottom to form an open chamber 3 having short legs 25. This casing is provided with the usual spaced brackets 4 on its sides and has two small apertures 5 near the top thereof. Surrounding this casing 1 is a second casing 6 which has an inner lining of insulating material 7 such as asbestos or the like. This casing 6 stops on a level with the bottom of the inner casing 1 and an air space is left between the insulation and the casing 1. Near the lower part of the oven proper apertures 8 are provided through the insulation and the casing. There are preferably four of these apertures, one in each side wall and two through the rear wall of the casing, but this may be varied according to the size of the oven. At the top, there is another opening 9 provided with a valve or damper 10 so that it may be closed when desired.

The oven has a door 30 which is made as nearly air tight as possible and is formed similarly to the oven, having double walls with a lining of insulation on the inside of the outer wall. In the door a window is placed, but this is not essential. By using the small apertures 5 and 8, a slow circulation of air is obtained, the heated air passing slowly out through the apertures 5 and then around the inner casing and out through the apertures 8.

In the bottom of the oven are a series of spaced apertures 11, there being preferably two rows of three each and the apertures are grouped in the middle of the bottom. There is a layer 12 of insulating material on the bottom, the material here used being asbestos paper or the like and it is provided with apertures 13 alined with the openings 11 in the bottom but the apertures 13 and the insulation overhangs the edges of the apertures 11 and extends therethrough slightly as clearly seen in Fig. 1.

Through these apertures, standard electric bulbs of the nitrogen type are mounted. This type of bulb has proved very satisfactory as it has an upper spherical portion 14 and a lower elongated portion 15 terminating in the usual threaded base. This type of bulb has a concentrated filament 16 and long leads 17 extending through the portion 15 and provided with a disk 18 of mica or the like to keep the heat from passing into the elongated portion of the bulb.

It has been found that the upper portion of the bulb will withstand from 650° to 750° Fahrenheit while this amount of heat will melt the cement and destroy the base of the bulb. In the present oven the lower elongated portion is in the open chamber 3 where the air of the room has free access and the bulbs remain at a temperature well below the danger point.

The mounting for the bulbs consists of a strap 20 provided with sockets 21 into which the bulbs are screwed. This strap has its ends bent to fit against the walls of the chamber and slots 22 are provided in such bent ends. Bolts 23 are mounted through apertures 24 in the walls and through the slots to provide adjustment for the strap, so that various sizes of bulbs may be employed. Only one such strap is shown but there will preferably be two such straps each carrying three sockets but the number of straps and sockets will of course vary with the size of the oven and the heating effect desired.

The sockets are electrically connected to a switch of any type which will allow the lamps to be turned on one at a time or in pairs, so that various degrees of heat may be obtained.

Above the lamps on the lowest brackets, a hot plate 26 is mounted. This plate has a solid central portion 27 with extending rods or fingers 28 forming an air passage around the same. There is a depending flange 29 about the central portion which tends to retain the heat between the plate and the bottom as the bulbs are close to the lower side of the plate. On the brackets are mounted an open rack 31 of the usual construction and near the top is mounted a movable reflector plate 32 which will be spaced from the hot plate at the correct distance, depending on the food being cooked.

The oven is well adapted to be used for cooking various articles, the heat being regulated by the number of bulbs in circuit. The usual type of oven has a cooking chamber above the hot plate of about 8 by 16x12 inches and for this size oven it has been found desirable to use six bulbs aggregating approximately 700 watts. The bulb wattage will vary of course with the oven size and the degree of heat to be obtained.

Distinct advantages are obtained, as standard nitrogen lamps can be obtained almost anywhere at the present time. The lamps heat up much faster than the usual grid and thus effect a saving in time. The saving in weight by using lamps instead of the grids or heating coils is very considerable and makes an oven which can be easily handled and moved. It has been found easy to obtain sufficient heat on the hot plate to broil on the same and the oven can be used for all purposes. When the required degree of heat is once established, it can be maintained by less lamps and those not needed will be switched off.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. In an electric oven, the combination of an insulated chamber having an apertured bottom, insulating material on said bottom and extending through such apertures and lamps set in such apertures and having their lower ends below such bottom, and electrical connections for such lamps.

2. In an electric oven, the combination of an insulated chamber having an apertured bottom, insulating material covering said bottom and having alined apertures but overhanging the edges of such apertures in said bottom, lamp bulbs mounted through such apertures and having their lower portion below said bottom, sockets for said lamps mounted below said bottom and electrical connections including a switch for said lamps.

3. In an electric oven, the combination of an insulated chamber having an apertured bottom, insulating material covering said bottom and having alined apertures but overhanging the edges of such apertures in said bottom, lamp bulbs mounted through such apertures and having their lower portion below said bottom, a hot plate mounted over said bulbs, sockets for said lamps mounted below said bottom, and electrical connections including a switch for said lamps.

4. In an electric oven, the combination of an insulated chamber having an apertured bottom, insulating material covering said bottom and having alined apertures but overhanging the edges of such apertures in said bottom, lamp bulbs mounted through such apertures and having their lower portion below said bottom, a hot plate mounted over said bulbs, said plate having a depending flange on its lower side, sockets for said lamps mounted below said bottom and electrical circuit connections for said lamps, including switch means for including one or more lamps in circuit.

5. In an electric oven, the combination of an insulated chamber having an open lower portion and an apertured bottom, insulating material on said bottom and having alined apertures but such insulation being adapted to overhang the edges of such apertures in said bottom, straps adjustably mounted in said open lower portion and carrying lamp sockets alined with such apertures, bulbs mounted in such apertures and received in said sockets, the bulbs having their filaments above said bottom, but extending below the same to said sockets and electrical circuit connections for said lamps and sockets including switch means for controlling the lamps in or out of said circuit.

Signed by me, this 3rd day of May, 1918.

JULIUS W. HOPKINS.